(12) United States Patent  
Clapeau

(10) Patent No.: US 7,178,624 B2  
(45) Date of Patent: Feb. 20, 2007

(54) STEERING SYSTEM RELEASE DEVICE FOR A VEHICLE WITH ELECTRIC POWER STEERING

(75) Inventor: Vincent Clapeau, Paris (FR)

(73) Assignee: Koyo Steering Europe (K.S.E.), Irigny (FR)

( * ) Notice: Subject to any disclaimer, the term of this patent is extended or adjusted under 35 U.S.C. 154(b) by 203 days.

(21) Appl. No.: 10/506,350

(22) PCT Filed: Mar. 19, 2003

(86) PCT No.: PCT/FR03/00879

§ 371 (c)(1), (2), (4) Date: Oct. 15, 2004

(87) PCT Pub. No.: WO03/080406

PCT Pub. Date: Oct. 2, 2003

(65) Prior Publication Data

US 2005/0103562 A1 May 19, 2005

(30) Foreign Application Priority Data

Mar. 25, 2002 (FR) .................................. 02 03706

(51) Int. Cl.  
*B62D 5/04* (2006.01)

(52) U.S. Cl. ........................................ 180/443; 70/252

(58) Field of Classification Search ................ 180/444, 180/287, 89; 70/252  
See application file for complete search history.

(56) References Cited

U.S. PATENT DOCUMENTS

| 5,893,429 | A  | * | 4/1999 | Hackl et al. ................. 180/443 |
| 6,516,640 | B2 | * | 2/2003 | Jacobs et al. ................. 70/186 |
| 6,659,218 | B2 | * | 12/2003 | Thomas et al. ............. 180/402 |
| 6,705,422 | B2 | * | 3/2004 | Maekawa .................... 180/444 |

FOREIGN PATENT DOCUMENTS

| DE | 43 03 485 A1 | 8/1994 |
| DE | 196 01 827 A1 | 7/1997 |
| DE | 199 40 323 A1 | 3/2001 |
| DE | 100 16 487 A1 | 10/2001 |
| FR | 2 821 312 A1 | 8/2002 |

* cited by examiner

*Primary Examiner*—Tony Winner  
(74) *Attorney, Agent, or Firm*—Oliff & Berridge, PLC

(57) ABSTRACT

A device that is used for the automatic release, without any manual effort, of the steering system in a motor vehicle comprising electric power steering and a locking mechanism which acts on the steering column or on another part of the steering system. A controller, which is connected to an electric assist motor, receives signals from at least one vehicle status and/or initiating event detector and controls the motor in order to rotate the steering column or move another part of the steering system until the torque or stress on the locking mechanism is cancelled or reduced to almost zero, thereby enabling said mechanism to be released. The control of the motor is automatically interrupted at the end of a pre-determined period of time if the mechanism has not been released.

20 Claims, 1 Drawing Sheet

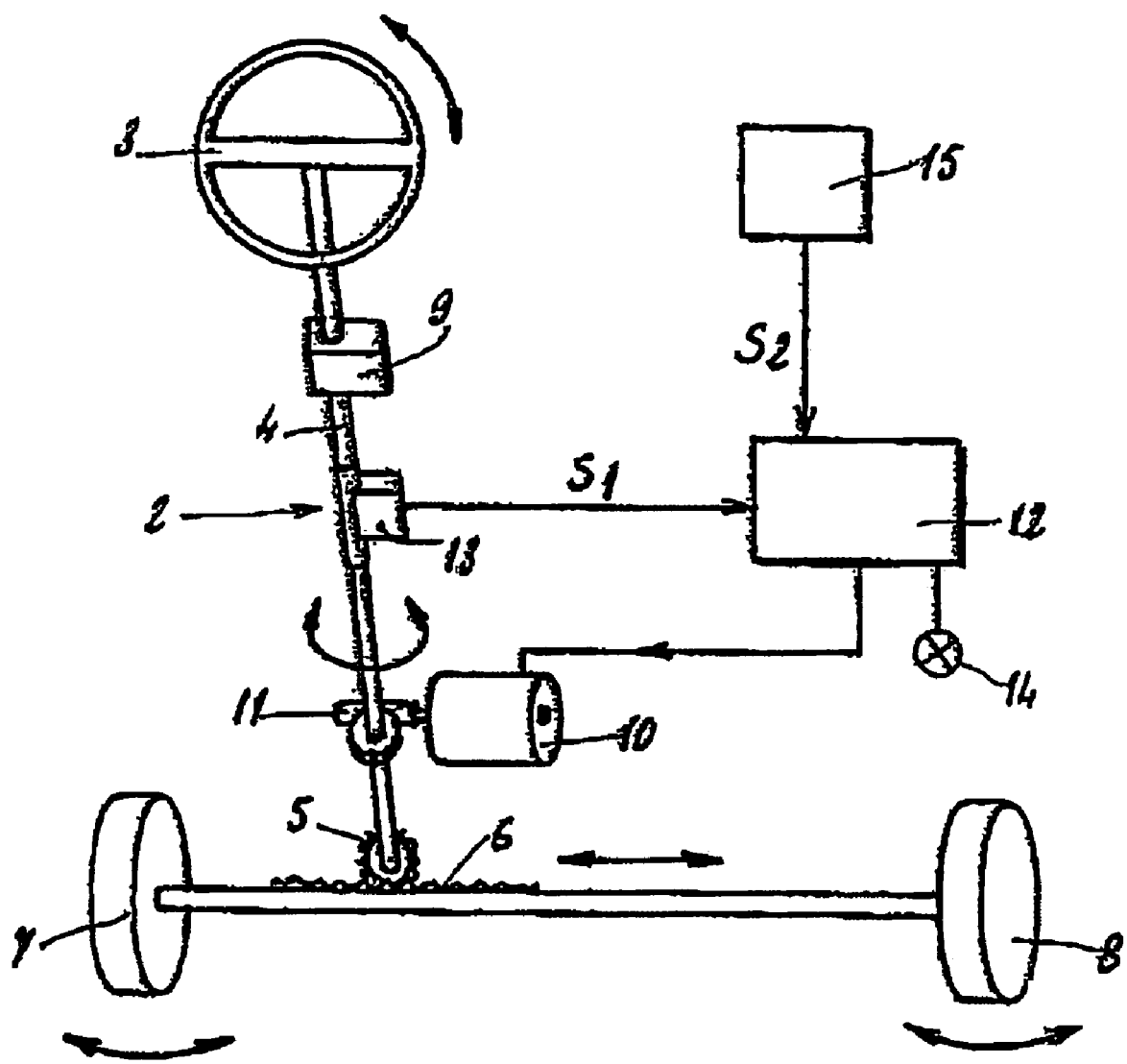

STEERING SYSTEM RELEASE DEVICE FOR A VEHICLE WITH ELECTRIC POWER STEERING

BACKGROUND

The present invention generally relates to motor vehicles equipped with electric-type power-assisted steering. It is concerned more specifically with a device for releasing or unlocking the steering system of such a vehicle, this device intervening following previous immobilization or locking of the same steering system.

The majority of motor vehicles are equipped with a steering system immobilizing device which is actuated when the vehicle is not being used in order to serve as an antitheft device, thereby preventing the vehicle from being driven.

Immobilization of the steering system of a motor vehicle equipped with a device intended for this purpose is usually carried out manually by the user turning the steering wheel until it is in an angular position for the latching of this immobilizing device, which then produces mechanical locking of the steering column. The reverse operation of releasing the steering system in some cases requires a manual effort to be exerted on the steering wheel, without power assistance being available, so that the locking element, which is in some cases under stress, can be disengaged from its locked position. Moreover, in the case of an electric antitheft system, the driver of the vehicle may in some cases not notice that the antitheft system has remained in the locked position, which will prevent subsequent starting of the vehicle.

In order to avoid these disadvantages, document DE 10016487 A has already proposed a release device which, by taking advantage of the specific characteristics of a certain type of power-assisted steering systems, namely electric power-assisted steering systems, prevents the user from exerting a manual effort to release the steering system while eliminating the risk that starting will be prohibited, this device providing automation of the release operation. Such a steering system release device for a motor vehicle equipped with electric power-assisted steering comprises, on the one hand, a locking mechanism acting on the steering column or on another part of the steering system, and, on the other hand, in combination with the electric assist motor for the steering system, control means which receive signals from at least one vehicle status and/or initiating event detector so as to activate the electric assist motor and rotate the steering column or translationally drive or otherwise move another part of the steering system, through the action of this electric motor, until a zero torque or load or a virtually zero residual torque or load has been achieved, in return for which the locking mechanism for the steering system can be released.

Thus, when the user wishes to start the vehicle, the electric power-assisted steering system is automatically activated in order to turn the steering column or move any part of the steering system until such a value of the torque or load exerted on the steering system locking mechanism has been achieved that unlocking may take place without difficulty.

Such a device provides the results and advantages which follow:

Firstly, it offers the user the possibility of no longer having to exert manual effort to release the steering system, since the electric power assistance of this steering system is exploited to turn the steering column or move any part of the steering system until unlocking is possible, with the result that "comfort" is increased. In this respect, it will be noted that the intervention of electric power-assisted steering for such a function does not pose any problem even when the combustion engine of the vehicle is still stopped (such would not be the case for a hydraulic power-assisted steering system, which would require a pump driven by the combustion engine).

The automatic nature of the proposed device, which is equipped with "intelligence", makes it impossible for there to be any non-unlocking of the system due to an excessively large torque or load that makes it impossible to start the engine. In fact, in all motor vehicles, whether the locking system is mechanical or electrical or other, starting of the vehicle is prohibited unless unlocking of the immobilizing system occurs.

The proposed system has a simple and economical structure. On the one hand, it can use sensors and detectors and an electronic computer which already exist on the vehicle. On the other hand, it does not require any conversion of the vehicle steering system and it uses a conventional or existing mechanism for locking the steering column or for locking another part of the steering system, this mechanism not even needing to be modified or adapted.

SUMMARY

However, as is described in the aforementioned document DE 10016487 A, the known release device still has disadvantages or shortcomings, in particular from the point of view of operational safety and of tailoring the operation to certain particular situations, this device not possessing any "intelligence". In particular, no consideration is given to a situation which nevertheless occurs relatively frequently, namely the case of a steered wheel of the motor vehicle encountering a fixed obstacle, such as a roadside curb, during the automatic release procedure before release of the steering system has been achieved.

The present invention therefore aims to improve a release device of the generic type indicated above in such a way as to tailor its operation to such situations in order to make this device truly operational and reliable.

To this end, the subject of the invention is a steering system release device of the generic type in question for a motor vehicle equipped with electric power-assisted steering, in which device the activation of the electric assist motor for releasing the steering system is automatically interrupted by the control means after a predetermined time in the event that the zero or virtually zero torque or load has not been achieved after this time. This offers a safety feature, especially in the event that a wheel of the vehicle should encounter an obstacle, such as a roadside curb, before release of the steering system.

Advantageously, the activation of the electric assist motor is automatically reversed by the control means after a first predetermined time in order to rotate the steering column or move another part of the steering system in the opposite direction to the initial direction until a zero or virtually zero torque or load has been created on the locking mechanism or until another predetermined time has been reached, this in the event that the zero or virtually zero torque or load has not been achieved after the first predetermined time. Thus, the invention offers an effective solution even in the event that, during the initial attempt at release (the steering system being moved in one direction), a wheel of the vehicle should encounter an obstacle, striking against a roadside curb, for example. Furthermore, the procedure is interrupted after a certain time if release has not been obtained with the second direction of rotation of the electric assist motor and whatever the cause thereof.

The invention also allows for the hypothesis in which, at the time when release of the steering system is requested, the torque or load on the locking mechanism is already zero or virtually zero. In the latter case, the electric assist motor is not activated for the purpose of releasing the steering system (this activation becoming unnecessary).

In the simplest embodiment of the steering system release device forming the subject of the invention, at the time of unlocking, this device is "ignorant" of the torque or load being applied at that instant. The computer will then give an order to the steering system, ordering it to move angularly to the right and then, if appropriate, to the left, or vice versa, with pre-established limit values until release of the steering system has been detected, but without taking account of the preferential direction for achieving the release state directly.

In order to avoid this disadvantage, in the case of a motor vehicle equipped with a sensor detecting the absolute or nonabsolute angular position of the steering column or with a sensor detecting the position of another part of the steering system, the control means belonging to the device of the invention may be designed to compare the initial angular position of the steering column, or the position of another part of the steering system, that is to say its position at the instant of detection of the initiating event, with pre-established angular positions in which the steering column is immobilized by the locking mechanism, or pre-established positions in which another part of the steering system is immobilized, and in order to bring about initial rotation of the electric assist motor in a direction corresponding to the shortest movement between the initial position and an immobilizing position so as to prevent an attempt at release in a direction opposite to the direction required. In other words, by using the information provided by an angle or position sensor, for example an absolute sensor giving an angular or other position with reference to a "zero" value, the device makes it possible to turn the steering column or to move any part of the steering system in the direction necessary for eliminating the residual torque on the locking mechanism, bringing the steering column, or another part of the steering system, toward the nearest release position.

The status and/or initiating event detector required for the steering system release device is a detector which detects insertion of an ignition key or of a magnetic card or of another similar means used for starting the vehicle (action of "switching on"). In all cases, the status and/or initiating event detectors generate electric-type signals which are transmitted to the control means, where they are processed and combined, to bring about rotation of the steering column by the electric assist motor or cause another part of the steering system to move, electrically supplying this motor with sufficient power so as to reduce to zero or virtually zero the torque or load on the locking mechanism, this mechanism being automatically placed in the unlocked position as soon as the torque or load is sufficiently small. As for the control means, which intervene to activate the electric assist motor as they receive and process the signals from the vehicle status and initiating event detectors and from the torque or position sensor, for the purpose of controlling the release process, these are advantageously formed by an electronic computer.

The invention will be better understood with the aid of the description which follows, with reference to the appended schematic drawing representing, by way of example, an embodiment of this steering system release device for a vehicle equipped with electric power-assisted steering.

BRIEF DESCRIPTION OF THE DRAWINGS

The single FIGURE of the drawing represents, very schematically, an example of an electric power-assisted steering system for a motor vehicle with an immobilizing device according to the present invention.

DETAILED DESCRIPTION OF EMBODIMENTS

This FIGURE shows the usual elements of a motor vehicle steering system 2, namely a steering wheel 3 connected to a steering column 4, of which the end remote from the steering wheel 3 bears a pinion 5 meshing with a rack 6, the two ends of the rack 6 being respectively connected, by way of tie rods, to the two steered wheels 7 and 8 of the vehicle in question.

The steering system 2 comprises a locking mechanism 9 having an antitheft function and arranged on the steering column 4, for example under the steering wheel 3. This is, for example, a locking mechanism 9 which is neutralized by the insertion of an ignition key in an ignition lock and which is activated when the ignition key is removed from its lock.

Since this is an electric power-assisted steering system, there is provided an electric assist motor 10 having two directions of rotation and in which the output shaft is coupled to the steering column 4 by way of a mechanical transmission 11 so as to transmit a drive torque to it.

The electric assist motor 10 is operated by an electronic computer 12; the latter receives, inter alia, an electrical signal S1 from a resistant-torque sensor 13 placed on the steering column 4 between the locking mechanism 9 and the point of engagement of the mechanical transmission 11 (not necessarily situated at the location illustrated in the drawing).

The electronic computer 12 also receives an electrical signal S2 from a status or initiating event detector 15, in particular a detector which detects the presence of the ignition key on the ignition lock, or other equivalent system, this status allowing intervention of the release device at the instant of an initiating event being detected.

The computer 12, which receives and processes the electrical signal S2 from the status or initiating event detector 15, will cause the electric assist motor 10 to be activated when this signal indicates that the vehicle is in the starting phase, until release of the steering system 2 by the locking mechanism 9, this taking place with a fully automatic procedure.

More specifically, as soon as the initiating event occurs, the electric assist motor 10 is supplied with electricity so as to turn in a given direction of rotation and with sufficient power to exert a torque on the steering column 4 and allow the latter to be released. The steering column 4 will stop turning as soon as release has been established or after a predetermined time t.

Even more specifically, if release of the steering system 2 is not established after the predetermined time t, the electric assist motor 10 will be supplied with electricity so as to turn in the opposite direction of rotation and with sufficient power to create a turning torque on the steering column 4 and thus allow it to be released. The steering column 4 will stop turning in the opposite direction as soon as release of this column has been established or after another predetermined time t' has elapsed.

An optional warning indicator 14, such as an indicating light, may warn the driver of the vehicle of the impossibility of releasing the steering system 2 on completion of the above-described automatic procedures; the driver may then attempt a traditional manual release.

If release is immediately established at the moment when it is requested, the above-described action (becoming unnecessary) will not be carried out.

The steering system release device described above can be applied to any motor vehicle equipped with an electric power-assisted steering system and with a mechanism for locking the steering column (or a locking system acting on another part of the steering system).

The scope of the present invention as defined in the appended claims would not be departed from by:

- using any torque-measuring means, not necessarily a torque sensor combined with a torsion bar, or a load sensor;
- controlling or not controlling the operation of the device with the aid of a steering system position sensor, for example an angular position sensor, or a sensor detecting the position or displacement of any part of this steering system;
- assigning other additional functions to the computer for more refined operation of the device;
- applying the device to vehicles whose locking mechanism is not necessarily neutralized or activated by an ignition key but may also be so by any other means, such as an encoded magnetic card that is to be inserted or removed;
- intending the device for a steering system in which the locking mechanism occupies any position on the steering system, not necessarily on the steering column, this locking mechanism possibly even being positioned on the assist motor;
- applying the device to electric power-assisted steering systems of any design irrespective in particular of the point of action or the mode of action of the electric assist motor on the steering system, the point of action possibly being situated on the steering column, on the pinion or on the rack, and the mode of action possibly being, depending on the component which is moved, a rotational operation or a translational operation.

The invention claimed is:

1. A steering system release device for a motor vehicle equipped with electric power-assisted steering, the steering system release device comprising:
    a locking mechanism that acts on a steering column or on another part of a steering system,
    an electric assist motor for the steering system,
    a controller which receives signals from at least one vehicle status and/or initiating event detector so as to activate the electric assist motor and to rotate the steering column or translationally drive or otherwise move another part of the steering system, through the action of the electric assist motor, until a zero torque or load or a virtually zero residual torque or load has been achieved, in return for which the locking mechanism can be released,
    wherein the vehicle status and/or initiating event detector is a detector which detects insertion of an ignition key or of a magnetic card or other means used for starting the vehicle,
    wherein the activation of the electric assist motor to release the locking mechanism the steering system is automatically interrupted by the controller after a predetermined time in the event that the zero or virtually zero torque or load has not been achieved after this time.

2. The steering system release device as claimed in claim 1, wherein if the zero or virtually zero torque or load has not been achieved after the first predetermined time, the activation of the electric assist motor is automatically reversed by the controller after a first predetermined time in order to rotate the steering column or move another part of the steering system in an opposite direction to an initial direction until the zero or virtually zero torque or load has been created on the locking mechanism or until another predetermined time has been reached.

3. The steering system release device as claimed in claim 2, wherein the electric assist motor is not activated if the torque or load on the locking mechanism is zero or virtually zero at the time when release of the steering system is requested.

4. The steering system release device as claimed in claim 2, further comprising a warning indicator that warns of the impossibility of releasing the steering system on completion of the procedures controlled by the controller.

5. The steering system release device as claimed in claim 2, wherein the controller receives a signal from a position sensor detecting the position of the steering system, the controller compares the signal from said position sensor with a predetermined value, said predetermined value corresponding to at least one position in which the steering column or another part of the steering system is immobilized by the locking mechanism, and the controller determines an initial direction of rotation in which the electric assist motor is driven.

6. The steering system release device as claimed in claim 5, wherein the position sensor is a sensor that detects the angular position of the steering column, or a sensor that detects the position of another part of the steering system.

7. The steering system release device as claimed in claim 2, wherein the controller is formed by an electronic computer.

8. The steering system release device as claimed in claim 1, wherein the electric assist motor is not activated if torque or load on the locking mechanism is zero or virtually zero at the time when release of the steering system is requested.

9. The steering system release device as claimed in claim 8, further comprising a warning indicator that warns of the impossibility of releasing the steering system on completion of the procedures controlled by the controller.

10. The steering system release device as claimed in claim 8, wherein the controller receives a signal from a position sensor detecting the position of the steering system, the controller compares the signal from, said position sensor with a predetermined value said predetermined value corresponding to at least one position in which the steering column or another part of the steering system is immobilized by the locking mechanism, and the controller determines an initial direction of rotation in which the electric assist motor is driven.

11. The steering system release device as claimed in claim 10, wherein the position sensor is a sensor that detects the angular position of the steering column, or a sensor that detects the position of another part of the steering system.

12. The steering system release device as claimed in claim 8, wherein the controller is formed by an electronic computer.

13. The steering system release device as claimed in claim 1, further comprising a warning indicator that warns of the impossibility of releasing the steering system on completion of the procedures controlled by the controller.

14. The steering system release device as claimed in claim 13, wherein the controller receives a signal from a position sensor detecting the position of the steering system, the controller compares the signal from said position sensor with a predetermined value, said predetermined value corresponding to at least one position in which the steering column or another part of the steering system is immobilized by the locking mechanism, and the controller determines an initial direction of rotation in which the electric assist motor is driven.

15. The steering system release device as claimed in claim 14, wherein the position sensor is a sensor that detects the angular position of the steering column, or a sensor that detects the position of another part of the steering system.

16. The steering system release device as claimed in claim 13, wherein the controller is formed by an electronic computer.

17. The steering system release device as claimed in claim 1, wherein the controller receives a signal from a position sensor detecting the position of the steering system, the controller compares the signal from said position sensor with a predetermined value, said predetermined value corresponding to at least one position in which the steering column or another part of the steering system is immobilized by the locking mechanism, and the controller determines an initial direction of rotation in which the electric assist motor is driven.

18. The steering system release device as claimed in claim 17, wherein the controller is formed by an electronic computer.

19. The steering system release device as claimed in claim 17, wherein the position sensor is a sensor that detects the angular position of the steering column, or a sensor that detects the position of another part of the steering system.

20. The steering system release device as claimed in claim 1, wherein the controller is formed by an electronic computer.

* * * * *